(12) United States Patent
Webb et al.

(10) Patent No.: US 6,858,690 B2
(45) Date of Patent: Feb. 22, 2005

(54) PROCESS FOR POLYMERIZING CATIONICALLY POLYMERIZABLE MONOMERS

(75) Inventors: Robert Norman Webb, Kingwood, TX (US); Michael Francis McDonald, Kingwood, TX (US); David Yen-Lung Chung, Bellaire, TX (US); Yuan-Ju Chen, Houston, TX (US); Richard Dwight Hembree, Zachary, LA (US); John Patrick Soisson, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/627,005

(22) Filed: Jul. 25, 2003

(65) Prior Publication Data

US 2004/0059076 A1 Mar. 25, 2004

Related U.S. Application Data

(63) Continuation-in-part of application No. 10/138,466, filed on May 3, 2002, now Pat. No. 6,620,898, which is a continuation of application No. 09/684,713, filed on Oct. 6, 2000, now Pat. No. 6,444,768, application No. 10/627,005, which is a continuation-in-part of application No. 10/433,444, filed as application No. PCT/US01/04731 on Feb. 14, 2001.
(60) Provisional application No. 60/403,264, filed on Aug. 13, 2002, provisional application No. 60/403,174, filed on Aug. 13, 2002, provisional application No. 60/402,990, filed on Aug. 13, 2002, provisional application No. 60/257,141, filed on Dec. 20, 2000, provisional application No. 60/165,573, filed on Nov. 15, 1999, and provisional application No. 60/165,453, filed on Nov. 15, 1999.

(51) Int. Cl.$^7$ .............................. C08F 2/14; C08F 10/10
(52) U.S. Cl. ....................... 526/212; 526/135; 526/185; 526/210; 526/213; 526/216; 526/237; 526/339; 526/347; 526/348.7
(58) Field of Search ................................ 526/210, 212, 526/237, 339, 347, 348.7, 135, 185, 213, 216

(56) References Cited

U.S. PATENT DOCUMENTS

| | | | |
|---|---|---|---|
| 3,560,458 A | 2/1971 | Kennedy et al. | 260/85.3 |
| 4,146,692 A | 3/1979 | Wagensommer et al. | 526/65 |
| 4,171,414 A | 10/1979 | Wagensommer et al. | 526/185 |
| 4,269,955 A | 5/1981 | Wagensommer et al. | 526/185 |
| 4,358,560 A | 11/1982 | Powers et al. | 524/568 |
| 4,611,037 A | 9/1986 | Musch et al. | 526/135 |
| 4,740,572 A | 4/1988 | Musch et al. | 526/135 |
| 5,162,445 A | 11/1992 | Powers et al. | 525/333.4 |
| 5,169,914 A | 12/1992 | Kaszas et al. | 526/135 |
| 5,206,043 A | 4/1993 | White | 426/106 |
| 5,211,974 A | 5/1993 | White | 426/106 |
| 5,247,021 A | 9/1993 | Fujisawa et al. | 525/254 |
| 5,376,744 A | 12/1994 | Kennedy et al. | 526/89 |
| 5,403,803 A | 4/1995 | Shaffer et al. | 502/111 |
| 5,417,930 A | 5/1995 | McDonald, Jr. et al. | 422/131 |
| 5,458,796 A | 10/1995 | Storey et al. | 252/58 |
| 5,506,316 A | 4/1996 | Shaffer | 426/185 |
| 5,539,065 A * | 7/1996 | Baade et al. | 526/74 |
| 5,580,935 A | 12/1996 | Shaffer | 525/333.7 |
| 5,639,525 A | 6/1997 | Kuhn et al. | 428/35.5 |
| 5,703,183 A | 12/1997 | Shaffer | 526/189 |
| 5,731,053 A | 3/1998 | Kuhn et al. | 428/369.2 |
| 6,274,689 B1 * | 8/2001 | Shaffer et al. | 526/336 |
| 6,444,768 B1 | 9/2002 | Webb et al. | 526/237 |

FOREIGN PATENT DOCUMENTS

| | | | | |
|---|---|---|---|---|
| EP | 0 279 456 B1 | 8/1988 | | C08F/10/10 |
| EP | 0 599 356 B1 | 12/1995 | | C09K/3/10 |
| EP | 0 478 110 B1 | 3/1996 | | C09K/3/10 |
| EP | 0 488 491 B1 | 3/1996 | | C09K/3/10 |
| EP | 0 713 883 A1 | 5/1996 | | C08F/2/06 |
| EP | 0 722 957 A1 | 7/1996 | | C08F/10/10 |
| WO | WO 93/21241 | 10/1993 | | C08F/210/12 |
| WO | WO 95/29940 | 11/1995 | | C08F/10/00 |
| WO | WO 97/35895 | 10/1997 | | C08F/8/00 |
| WO | WO 00/40624 | 7/2000 | | C08F/210/12 |
| WO | WO 01/36498 | 5/2001 | | C08F/10/00 |
| WO | WO 02/50129 | 6/2002 | | C08F/4/44 |
| WO | WO 02/50141 | 6/2002 | | C08F/210/10 |

OTHER PUBLICATIONS

Faust, et al., "Living Carbocationic Polymerization. XXXIX. On the Nature of the Active Species in Isobutylene and Vinyl Ether Polymerization", Journal of Macromol. Sci.–Chem., A28(1), pp. 1–13 (1991), Marcel Dekker, Inc.

J.P. Kennedy and E. Marechal, "Carbocationic Polymerization", pp. 32, 199, 499, 452, 460 and 461, (1982) John Wiley & Sons.

J.P. Kennedy et al, "Carbocationic Polymerization in the Presence of Sterically Hindered Bases", Journal of Macromolecular Science Chemistry, vol. A18, No. 1, pp. 1–152, (1982), Marcel Dekker, Inc., New York.

Kaszas, et al., "Electron–Pair Donors in Carbocationic Polymerization, III. Carbocation Stabilization by External Electron–Pair Donors in Isobutylene Polymerization", Journal of Macromol. Sci.–Chem., A26(8), pp. 1099–1114 (1989), Marcel Dekker, Inc.

Kaszas, et al., "Quasiliving Carbocationic Polymerization XII. Forced Ideal Copolymerization of Isobutylene with Styrene", Journal of Macromol. Sci.–Chem., A18(9), pp. 1367–1382 (1982–83), Marcel Dekker, Inc.

(List continued on next page.)

*Primary Examiner*—Fred Teskin
(74) *Attorney, Agent, or Firm*—Leandro Arechederra; Kevin M. Faulkner

(57) ABSTRACT

The invention relates to a new catalyst system that improves the heat transfer capability of a butyl reactor slurry process system in the production of isobutylene-based polymers in continuous slurry polymerization processes. The process is carried out in an anhydrous polymerization system containing a mixture of the monomers in a polar diluent along with a Lewis acid and a $C_5$ or greater initiator having a tertiary halide.

21 Claims, 8 Drawing Sheets

OTHER PUBLICATIONS

Kelen et al., "*Some Aspects of the Living Isobutylene Polymerization*", Makromol. Chem., Macromol. Symp. 67, pp. 325–339 (1993).

Kennedy, et al., "*Living Carbocationic Polymerization. XXXIX. Isobutylene Polymerization in the Presence of Pyridine and various other Electron Donors*", Journal of Macromol. Sci.–Chem., A28(2), pp. 197–207 (1991), Marcel Dekker, Inc.

Kresge and Wang, "*Elastomers, Synthetic (Butyl Rubber)*", Kirk–Othmer Encyclopedia of Chemical Technology, 4th Edition, vol. 8, pp. 934–955, (1993), John Wiley & Sons, New York, NY.

Lubnin, et al., "*Identification of Initiator Fragments in Polyisobutylene by NMR Spectroscopy*", J.M.S.–Pure Appl. Chem., A31(6), pp. 655–663 (1994), Marcel Dekker, Inc.

O. Nuyken, et al., "*Recent Progress Towards an Understanding of the Inifer Mechanism*", Polymer Preprints 26 (1), pp. 44–45, (1985).

Pernecker, et al., "*Living Carbocationic Polymerization. LVII. Kinetic Treatment of Living Carbocationic Polymerization Mediated by the Common Ion Effect*", J.M.S.–Pure Appl. Chem., A30(6 & 7), pp. 399–412 (1993), Marcel Dekker, Inc.

Storey, et al., "*Kinetic Investigation of the Living Cationic Polymerization of Isobutylene Initiated by 2–Chloro–2, 4,4–Trimethyl Pentane*", Polymer Preprint 36(2), pp. 304–305 (1995).

Storey, et al., "*Synthesis and Characterization of Polyisobutylene Star–Branched Polymers*", Polymer Preprint 35(2), pp. 578–579 (1994).

\* cited by examiner

Fig. 2 Slurry Side Heat Transfer Coefficient

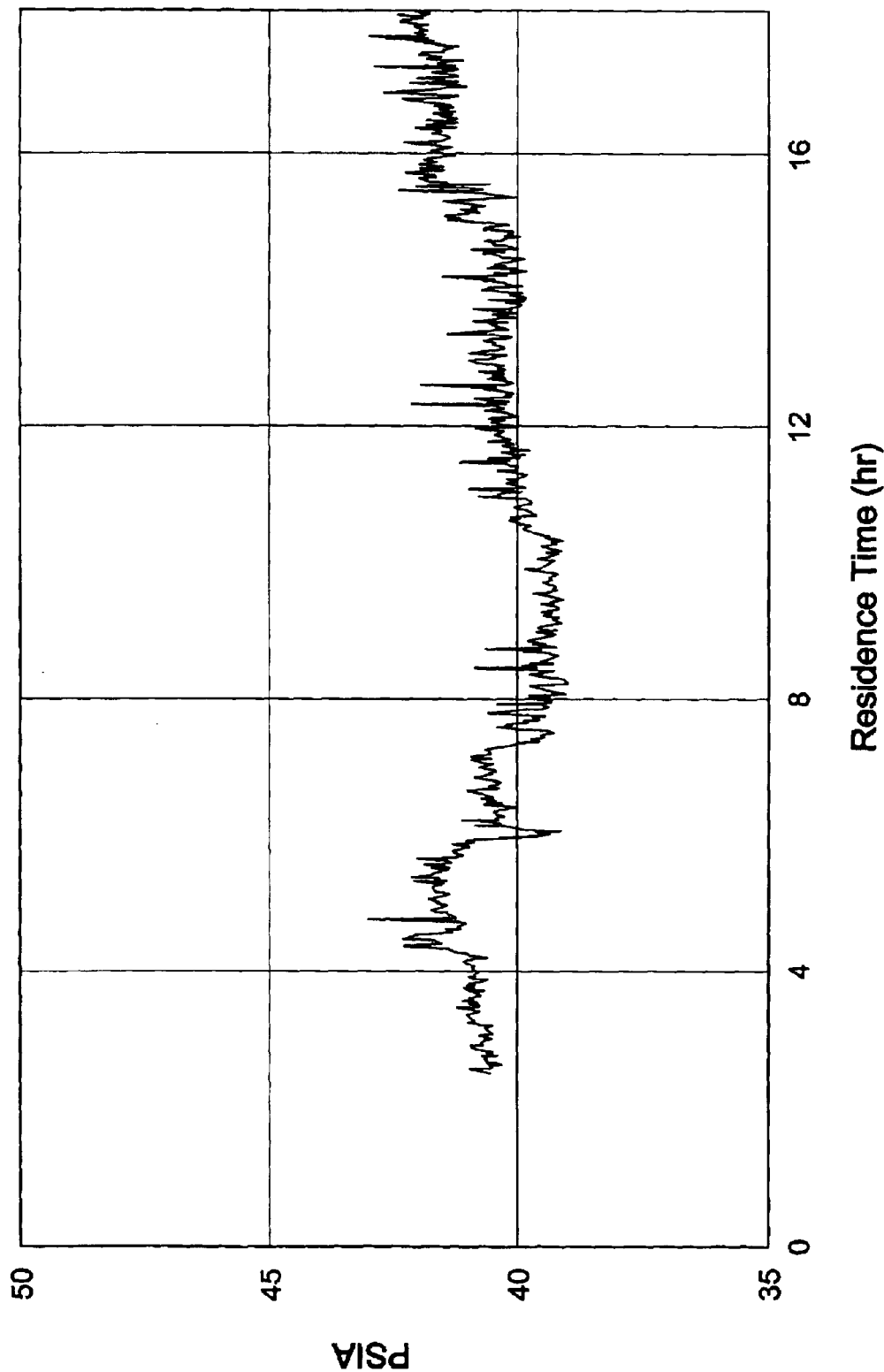
Fig. 4A Feed Line Pressure with TMPCl initiator

PROCESS FOR POLYMERIZING CATIONICALLY POLYMERIZABLE MONOMERS

CROSS REFERENCE TO RELATED APPLICATIONS

This application:

is a continuation-in-part of Ser. No. 10/138,466, filed May 3, 2002, now U.S. Pat. No. 6,620,898, which is a continuation of Ser. No. 09/684,713, filed Oct. 6, 2000, U.S. Pat. No. 6,444,768, that claims the benefit of Provisional Application Nos. 60/165,453 and 60/165,573, both filed Nov. 15, 1999;

is also a continuation-in-part of Ser. No. 10/433,444, filed Jun. 2, 2003, which as a National Stage Application of PCT/US01/04731, filed Feb. 14, 2001, that claims the benefit of Provisional Application No. 60/257,141, filed Dec. 20, 2000; and also claims the benefit of Provisional Application Nos. 60/403,264, 60/403,174, and 60/402,990, all filed Aug. 13, 2002;

the disclosures of which are fully incorporated by reference in their entireties.

FIELD OF INVENTION

The present invention relates to an improved method for production of isobutylene-based polymers useful in rubber compounds.

BACKGROUND

Isobutylene-isoprene polymers, generally termed "butyl rubbers", have been well known since the 1930s and their synthesis and properties are described by Kresge and Wang in 8 KIRK-OTHMER ENCYCLOPEDIA OF CHEMICAL TECHNOLOGY, pp. 934–955 (4th ed. 1993). These butyl rubber polymers have good impermeability to air and a high level of damping when stretched or compressed, and are used extensively throughout the tire and pharmaceutical industries. The copolymers are made by a cationic slurry polymerization process at approximately −95° C. using a catalyst comprising a Lewis Acid and an initiator. Initiators such as water and anhydrous HCl are used extensively. Related patents are EP 0 279 456; WO 00/40624; U.S. Pat. Nos. 4,385,560, 5,169,914, and 5,506,316, herein incorporated by reference.

Other background references include U.S. Pat. Nos. 4,146,692, 4,171,414, and 4,269,955.

The commercial reactors used to make these rubbers are well mixed vessels of greater than 10 to 30 liters in volume with a high circulation rate provided by a pump impeller. The polymerization and the pump both generate heat and, in order to keep the slurry cold, the reactor contains a heat exchanger. One embodiment of such a continuous flow stirred tank reactor ("CFSTR") is found in U.S. Pat. No. 5,417,930, incorporated by reference, hereinafter referred to in general as a "reactor" or "butyl reactor". In these reactors, slurry (reacted monomers) is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively foul, often referred to as film fouling, which causes the slurry temperature to rise. This often limits the practical slurry concentration that can be used in most reactors from 21 to 28 wt % relative to the total weight of the slurry, diluent, and unreacted monomers.

As the slurry temperature increases, there is evidence that the slurry viscosity rises, causing a measurable reduction in the heat transfer coefficient and a further increase in slurry temperature. The increase in temperature will cause a further increase in viscosity and the progression continues until the slurry becomes unstable and starts to agglomerate which can lead to reactor plugging. Consequently, reactors experiencing rapid warm up, often referred to as run away, are taken out of service quickly to avoid fouling and plugging, and subsequent plant upsets.

Reactor "warm-up" then refers to the gradual rise in the temperature of the reactor as a polymerization run progresses. At a constant polymerization rate, the warm-up is the result of a progressive loss of heat removal capability in the reactor. The heat removed from the reactor can be represented mathematically by the following equation (1):

$$Q=(U)(A)(T_{slurry}-T_{ethylene}) \quad (1)$$

where "Q" is the heat removed, "A" is the surface area of the reactor, "U" is the overall heat transfer coefficient, which is a composite of several heat transfer coefficients for the slurry itself, the walls of the reactor, the film formed on the reactor wall, and the boiling ethylene used to draw heat from the exothermic polymerization reaction. The "T" values are the temperatures of the slurry and ethylene, respectively.

In the polymerization process, the temperature difference driving force for heat transfer must increase if (a) the overall heat transfer coefficient U decreases, and/or (b) the heat transfer area is lost during a reactor run, such as by plugged tubes. Both can occur as a result of film formation and mass fouling of the reactor. Also, U will decrease if the reactor circulation rate drops or the slurry viscosity increases. Although not wishing to be bound by the following mathematical relationship, the slurry side heat transfer coefficient can be related to the viscosity of the slurry by the Sieder-Tate equation for turbulent fluid flow as shown below in equation (2):

$$\frac{h_{slurry}D}{k} = (0.023)\left(\frac{Dv\rho}{\mu_b}\right)^{0.8}\left(\frac{\mu_b c_p}{k}\right)^{0.4}\left(\frac{\mu_b}{\mu_w}\right)^{0.167} \quad (2)$$

where $h_{slurry}$ is the slurry side heat transfer coefficient, D is the diameter of the reactor heat transfer tube, k is the thermal conductivity of the reactor polymerizing slurry, v is the average velocity of the slurry inside the tube, ρ is the average density of the slurry, $\mu_b$ is the average bulk viscosity of the polymerizing slurry, $c_p$ is the specific heat of the polymerizing slurry, and $\mu_w$ is the average wall viscosity of the polymerizing slurry. Therefore, $h_{slurry}$ is proportional to $(1/\mu_b)^{0.4}$ in equation (2).

Operating problems associated with using these reactors vary depending upon the specific reaction taking place and the specific location within the reactor. One problem with these reactors is the presence of non-homogenous zones beneath (or above) the pump impeller where feed is introduced. The monomer-rich zone adjacent the pump can be particularly troublesome because feed may be introduced with as high as 40% monomer concentration, whereas the steady-state monomer level in the reactor is much lower, typically from 1% to 10%. The inventors have found that, surprisingly, if an initiator such as a $C_5$ or greater tertiary halo-alkyl is added to the system, the reactor heat transfer efficiency improves, consistent with a reduction in viscosity of the slurry. This is unexpected for at least two reasons.

First, the use of the initiator 2-chloro-2,4,4-trimethylpentane (TMPCl) has been demonstrated in the polymerization of an olefin and the highly reactive para-alkylstyrene, as disclosed in U.S. Ser. No. 09/684,713, filed on Oct. 6, 2000 (assigned to the assignee of the present application). However, conjugated dienes, such as used in butyl rubber production, are known to act as retarding monomers in polymerizations. This observation would tend to teach away from using a TMPCl or other $C_5$ or larger initiators in the polymerization of butyl rubber.

Second, certain tertiary alkyl halide initiators such as tert-butylchloride (a $C_4$ tertiary halide) have been shown by Kennedy et al. in U.S. Pat. No. 3,560,458 to improve isobutylene polymerization in small scale, batch experiments when compared to HCl. Yet, there is little to no improvement when comparing tert-butylchloride and TMPCl in small scale batch experiments. Further, the lack of steady state conditions in the small batch process means that heat transfer and viscosity changes would not be apparent when going to a continuous, slurry process, nor would the associated problem of reactor fouling.

The inventors have unexpectedly found that certain alkyl halide compounds greater than $C_4$ significantly reduces reactor fouling associated with using HCl as an initiator for butyl rubber polymerization in continuous slurry reactors. The present invention enables a higher slurry concentration and/or longer run lengths than would otherwise be practical in most commercial reactors.

SUMMARY OF THE INVENTION

Thus, an object of the present invention is to provide a method of improving heat transfer within a butyl reactor by employing an improved catalyst system for the polymerization of an isoolefin with a conjugated diene to form butyl rubber.

The improved catalyst system comprises a Lewis Acid and an initiator that improves heat transfer from the polymerizing slurry to the heat exchanging system built into the reactor by lowering the heat transfer coefficient of the slurry. This will ultimately lower the fouling rate, and allow higher concentrations of monomer to be injected into the reactor and higher slurry concentrations to be maintained, and/or allow the reactor to run for a longer period of time before washing, thus improving the commercial value of the product and process.

An embodiment of the present invention is a method of improving the heat transfer capability within a continuous slurry polymerization reactor in preparing random copolymers of one or more isoolefin monomers and one or more conjugated diene monomers, the reacted monomers forming a slurry within the reactor. The method comprises reacting in a polar diluent the isoolefin and diene monomers, a Lewis acid, and an initiator, wherein the initiator has the formula:

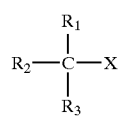

(A)

wherein X is a halogen; $R_1$ is selected from the group consisting of $C_1$ to $C_8$ alkyl, and $C_2$ to $C_8$ alkenyl; $R_3$ is selected from the group consisting of $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl phenylalkyl, alkylphenyl, $C_3$ to $C_{10}$ cycloalkyl, and

(B)

wherein X is a halogen; $R_5$ is selected from the group consisting of $C_1$ to $C_8$ alkyl, and $C_2$ to $C_8$ alkenyl; $R_6$ is selected from the group consisting of $C_1$ to $C_8$ alkyl, $C_2$ to $C_8$ alkenyl and phenylalkyl; and $R_4$ is selected from the group consisting of phenylene, biphenyl, $\alpha,\omega$-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position; wherein the Lewis acid and the initiator are contacted with a contact time of from less than 60 s prior to contacting with the isoolefin and the diene monomers. Further, the slurry within the reactor is in a concentration of 50 wt % or less in one embodiment.

In another embodiment, the invention provides for a catalyst system and process for production of isoolefin copolymers containing a para-alkylstyrene comonomers. An improved catalyst system and process has been discovered which affords many unexpected advantages for commercial slurry polymerization of these copolymers generally, and in particular isobutylene para-methylsytrene (IPMS) copolymers. The invention is particularly useful in production of isoolefin-para-alkylstyrene (IPAS) copolymers having a higher PAS content, particularly isobutylene-para-methylstyrene (IPMS) copolymers having a higher PMS content (e.g. 10–20 weight percent PMS).

In a particularly preferred embodiment, the copolymers produced contain isobutylene as the isoolefin and para-methylstyrene as the para-alkylstyrene comonomer. Discussion of these preferred embodiments should not be construed so as to limit the broad invention, which is applicable generally to copolymers of one or more isoolefin and one or more para-alkylstyrene (PAS) monomers.

In accordance with the present invention applicants have discovered an improved polymerization system for copolymerizing an iso-mono-olefin having from 4 to 7 carbon atoms and para-alkylstyrene monomers. In accordance with a preferred embodiment of the invention, the process produces copolymers containing between about 80 and 99.5 wt % of the isoolefin such as isobutylene and between about 0.5 and 20 wt % of the para-alkylstyrene such as para-methylstyrene. In accordance with another embodiment, however, where glassy or plastic materials are being produced as well, the copolymers comprise between about 10 and 99.5 wt % of the isoolefin, or isobutylene, and about 0.5 and 90 wt % of the para-alkylstyrene, or para-methylstyrene.

In a particularly preferred embodiment, the invention provides for a continuous slurry polymerization process for preparing random copolymers of one or more isoolefin monomers and one or more para-alkylstyrene monomers comprising reacting in an anhydrous polymerization system of said monomers, a polar solvent, a Lewis acid, and an initiator, said polymerization system being capable of forming an in-situ electron pair donor initiator having the formula:

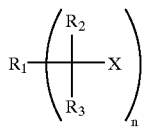

wherein:
R₁ is an alkyl, alkenyl, aryl, aralkyl, or aralkenyl group containing up to 30 carbon atoms but not less than 3 carbon atoms unless R₁ contains at least one olefinic unsaturation,
R₂ and R₃ are alkyl, aryl, or aralkyl groups containing up to 30 carbon atoms and can be the same or different,
x is a halogen or a carboxy, hydroxyl, or alkoxyl group, and
n is a positive whole number; and
wherein the Lewis acid and the initiator are contacted with a contact time of from less than 60 s prior to contacting with the isoolefin and the para-alkylstyrene monomers.

In another embodiment, the invention provides for the production of a polyisoolefin rubber. It is produced by the polymerization reaction between isoolefin monomers. The olefin polymerization feeds employed in the present invention are those olefinic compounds conventionally used in the preparation of isobutylene-type rubber polymers. Preferably, the polyisoolefin rubber are prepared by reacting monomers of a $C_4$ to $C_6$ isoolefin monomer component such as isobutene.

In one embodiment, the isoolefin is a $C_4$ to $C_6$ compound such as isobutylene, isobutene, 2-methyl-1-butene, 3-methyl-1-butene, 2-methyl-2-butene, and 4-methyl-1-pentene. Desirably, the isoolefin is isobutylene.

In a particularly preferred embodiment, the invention provides for a polymerization method for use in a continuous slurry polymerization reactor in preparing a homopolymer of an isoolefin, the reacted monomers forming the slurry within the reactor, a Lewis acid, and an initiator, wherein the initiator has the formula:

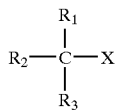

wherein X is a halogen; R₁ is selected from the group consisting of $C_1$ to $C_8$ alkyl, and $C_2$ to $C_8$ alkenyl; R₃ is selected from the group consisting of, $C_1$ to $C_8$ alkyl, $C_2$ to $C_8$ alkenyl and phenylalkyl; and R₂ is selected from the group consisting of $C_4$ to $C_{200}$ alkyl, $C_2$ to $C_8$ alkenyl, phenyl, phenylalkyl, alkylphenyl, $C_3$ to $C_{10}$ cycloalkyl, and

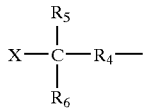

wherein X is a halogen; R₅ is selected from the group consisting of, $C_1$ to $C_8$ alkyl, and $C_2$ to $C_8$ alkenyl; R₆ is selected from the group consisting of, $C_1$ to $C_8$ alkyl, $C_2$ to $C_8$ alkenyl and phenylalkyl; and R₄ is selected from the group consisting of phenylene, biphenyl, α,ω-diphenylalkane and —$(CH_2)_n$—, wherein n is an integer from 1 to 10; and wherein R₁, R₂, and R₃ can also form adamantyl or bornyl ring systems, the X group being in a tertiary carbon position; and wherein the Lewis acid and the initiator are contacted with a contact time of from less than 60 s and prior to contacting with the isoolefin.

In any of the previous embodiments denoting contact times, alternative contact times may be from less than 60 s, less than 30 s, less than 25 s, less than 20 s, less than 15 s, less than 10 s, or less than 5 s.

BRIEF DESCRIPTION OF THE DRAWINGS

FIG. 4A is a graphical representation of data showing butyl polymerization conditions in an embodiment of the invention, the data plotted as the reactor pressure as a function of reactor residence time with TMPCl initiator present;

DETAILED DESCRIPTION

Figure 1:
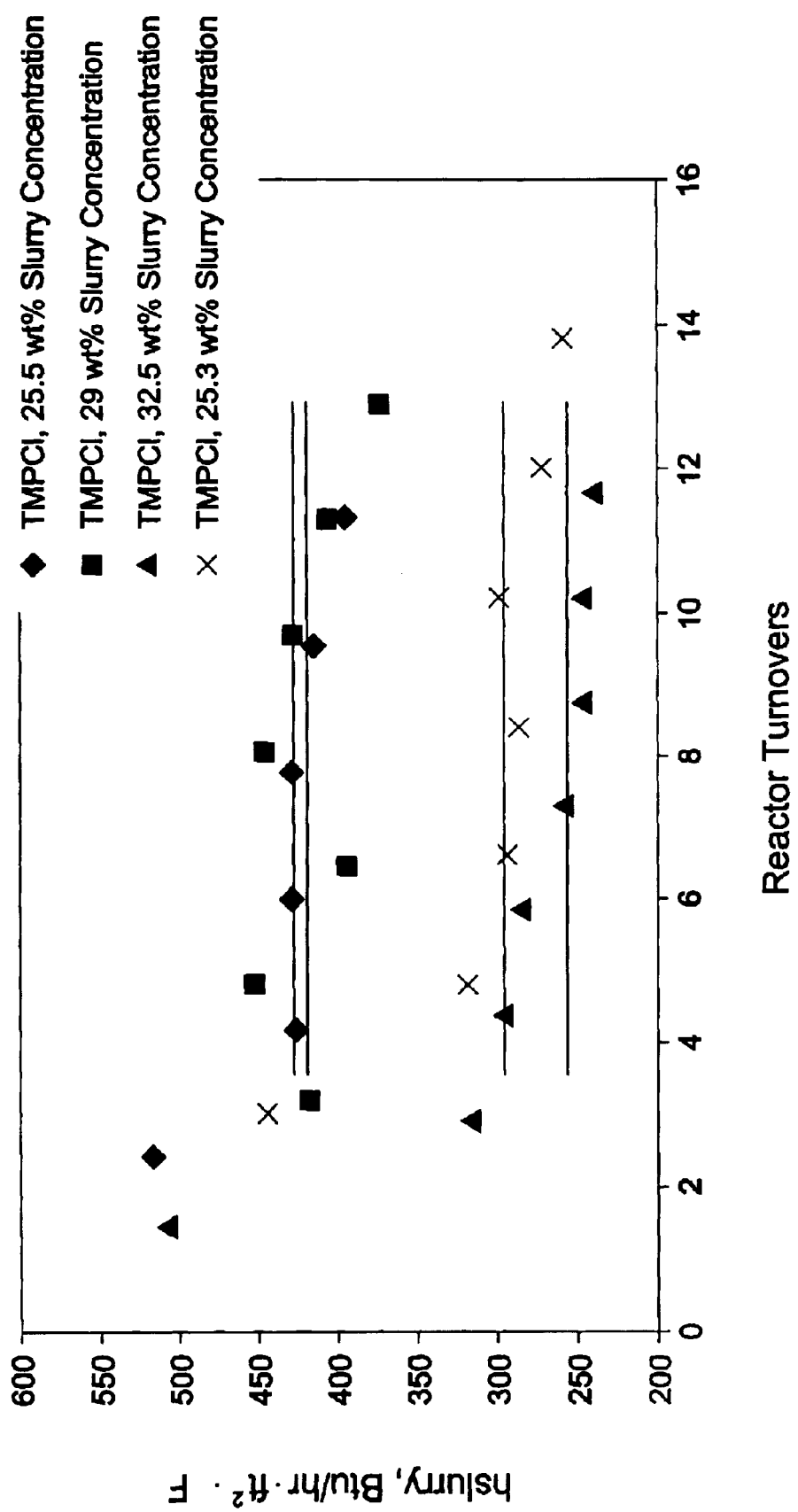
FIG. 1 is a graphical representation of data showing butyl polymerization conditions in an embodiment of the invention, the data plotted as the reactor slurry side heat transfer coefficient as a function of reactor turnover.

The invention concerns a catalyst system and process for production of isoolefin copolymers containing a conjugated diene comonomer. An improved catalyst system and process has been discovered which affords many unexpected advantages for commercial slurry polymerization processes. The discussion and examples below are focused on embodiments of the broad invention. To the extent that the description is specific, this is done solely for the purpose of illustrating exemplifying embodiments and should not be taken as restricting the invention to these embodiments.

The polymerization system of the invention contains a mixture of at least two monomers, a Lewis acid catalyst, an initiator, and a polar diluent. The copolymerization reactor is maintained substantially free of impurities which can complex with the catalyst, the initiator, or the monomers, and the polymerization reaction is conducted under conditions to limit or avoid chain transfer and termination of the growing polymer chains. Anhydrous conditions are highly preferred and reactive impurities, such as components containing active hydrogen atoms (water, alcohol and the like) must be removed from both the monomer and diluents by techniques well-known in the art.

Definition of Terms

As used herein, the term "catalyst system" refers to and includes any Lewis Acid or other metal complex used to catalyze the polymerization of the olefinic monomers of the invention, as well as the initiator described below, and other minor catalyst components.

As used herein, the "polymerization system" is the catalyst system and the monomers and reacted monomers within the butyl-type reactor.

As used herein, the term "slurry" refers to reacted monomers that have polymerized to a stage that they have precipitated from the diluent. The slurry "concentration" is the weight percent of these reacted monomers—the weight percent of the reacted monomers by total weight of the slurry, diluent, unreacted monomers, and catalyst system.

As used herein, the new numbering scheme for the Periodic Table Groups are used as in HAWLEY'S CONDENSED CHEMICAL DICTIONARY 852 (13th ed. 1997).

As used herein the term "butyl rubber" is defined to mean a polymer predominately comprised of repeat units derived from isobutylene but including repeat units derived from a conjugated diene.

Isobutylene-Based Polymers

Butyl rubber is produced by the polymerization reaction between isoolefin and a conjugated diene comonomers, thus containing isoolefin-derived units and conjugated diene-derived units. The olefin polymerization feeds employed in connection with the catalyst and initiator system (described in more detail below) are those olefinic compounds, the polymerization of which are known to be cationically initiated, and are free of aromatic monomers such as para-alkylstyrene monomers. Preferably, the olefin polymerization feeds employed in the present invention are those olefinic compounds conventionally used in the preparation of butyl-type rubber polymers. The butyl polymers are prepared by reacting a comonomer mixture, the mixture having at least (1) a $C_4$ to $C_6$ isoolefin monomer component such as isobutene with (2) a multiolefin, or conjugated diene, monomer component. The isoolefin is in a range from 70 to 99.5 wt % by weight of the total comonomer mixture in one embodiment, and 85 to 99.5 wt % in another embodiment. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene.

The isoolefin is a $C_4$ to $C_6$ compound such as isobutene or 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, hexadiene and piperylene. One embodiment of the butyl rubber polymer of the invention is obtained by reacting 95 to 99.5 wt % of isobutylene with 0.5 to 8 wt % isoprene, or from 0.5 wt % to 5.0 wt % isoprene in yet another embodiment.

In another embodiment, the invention provides for a catalyst system and process for production of isoolefin copolymers containing a para-alkylstyrene comonomers. An improved catalyst system and process has been discovered which affords many unexpected advantages for commercial slurry polymerization of these copolymers generally, and in particular isobutylene para-methylsytrene (IPMS) copolymers. The invention is particularly useful in production of isoolefin-para-alkylstyrene (IPAS) copolymers having a higher PAS content, particularly isobutylene-para-methylstyrene (IPMS) copolymers having a higher PMS content (e.g. 10–20 weight percent PMS).

In a particularly preferred embodiment, the copolymers produced contain isobutylene as the isoolefin and para-methylstyrene as the para-alkylstyrene comonomer. Discussion of these preferred embodiments should not be construed so as to limit the broad invention, which is applicable generally to copolymers of one or more isoolefin and one or more para-alkylstyrene (PAS) monomers.

In accordance with the present invention applicants have discovered an improved polymerization system for copolymerizing an iso-mono-olefin having from 4 to 7 carbon atoms and para-alkylstyrene monomers. In accordance with a preferred embodiment of the invention, the process produces copolymers containing between about 80 and 99.5 wt % of the isoolefin such as isobutylene and between about 0.5 and 20 wt % of the para-alkylstyrene such as para-methylstyrene. In accordance with another embodiment, however, where glassy or plastic materials are being produced as well, the copolymers comprise between about 10 and 99.5 wt % of the isoolefin, or isobutylene, and about 0.5 and 90 wt % of the para-alkylstyrene, or para-methylstyrene.

In another embodiment, the invention provides for the production of a polyisoolefin rubber. It is produced by the polymerization reaction between isoolefin monomers. The olefin polymerization feeds employed in the present invention are those olefinic compounds conventionally used in the preparation of isobutylene-type rubber polymers. Preferably, the polyisoolefin rubber are prepared by reacting monomers of a $C_4$ to $C_6$ isoolefin monomer component such as isobutene.

In one embodiment, the isoolefin is a $C_4$ to $C_6$ compound such as isobutylene, isobutene, 2-methyl-1-butene, 3-methyl-1-butene, 2-methyl-2-butene, and 4-methyl-1-pentene. Desirably, the isoolefin is isobutylene.

Lewis Acid

Isomonoolefin and conjugated diene, particularly isobutylene and isoprene, can be copolymerized under cationic conditions. The copolymerization is carried out by means of a Lewis Acid catalyst. Embodiments of the invention include Lewis Acid catalysts (including Friedel-Crafts catalysts) which show good polymerization activity. Desirable catalysts are Lewis Acids based on metals from Group 4, 13 and 15 of the Periodic Table of the Elements, including boron, aluminum, gallium, indium, titanium, zirconium, tin, vanadium, arsenic, antimony, and bismuth. In one embodiment, the metals are aluminum, boron and titanium, with aluminum being desirable. In the practice of the method of this invention, weaker acids are preferred as they lead to less alkylation and branching and higher monomer conversion rates.

The Group 13 Lewis Acids have the general formula $R_nMX_{3-n}$, wherein "M" is a Group 13 metal, R is a monovalent hydrocarbon radical selected from the group consisting of $C_1$ to $C_{12}$ alkyl, aryl, arylalkyl, alkylaryl and cycloalkyl radicals; and n is an integer from 0 to 3; X is a halogen independently selected from the group consisting of fluorine, chlorine, bromine, and iodine, preferably chlorine. The term "arylalkyl" refers to a radical containing both aliphatic and aromatic structures, the radical being at an alkyl position. The term "alkylaryl" refers to a radical containing both aliphatic and aromatic structures, the radical being at an aryl position. Nonlimiting examples of these Lewis acids include aluminum chloride, aluminum bromide, boron trifluoride, boron trichloride, ethyl aluminum dichloride ($EtAlCl_2$ or EADC), diethyl aluminum chloride ($Et_2AlCl$ or DEAC), ethyl aluminum sesquichloride ($Et_{1.5}AlCl_{1.5}$ or EASC), trimethyl aluminum, and triethyl aluminum.

The Group 4 Lewis Acids have the general formula $MX_4$, wherein M is a Group 4 metal and X is a ligand, preferably a halogen. Nonlimiting examples include titanium tetrachloride, zirconium tetrachloride, or tin tetrachloride.

The Group 15 Lewis Acids have the general formula $MX_y$, wherein M is a Group 15 metal, X is a ligand, preferably a halogen, and y is an integer from 3 to 5. Nonlimiting examples include vanadium tetrachloride and antimony pentafluoride.

Particularly preferred Lewis acids may be any of those useful in cationic polymerization of isobutylene copolymers including: $AlCl_3$, EADC, EASC, DEAC, $BF_3$, $TiCl_4$, etc. with EASC and EADC being especially preferred.

Catalyst efficiency (based on Lewis Acid) in the reactor is maintained between 10000 lb. of polymer/lb. of catalyst and 300 lb. of polymer/lb. of catalyst and desirably in the range of 4000 lb. of polymer/lb. of catalyst to 1000 lb. of polymer/lb. of catalyst by controlling the molar ratio of Lewis Acid to initiator.

Initiator

According to one embodiment of the invention, the Lewis Acid catalyst is used in combination with an initiator. The initiators are those initiators which are capable of being precomplexed in a suitable diluent with the chosen Lewis Acid to yield a complex which is in equilibrium with a carbenium ion pair which rapidly forms a propagating polymer chain in the reactor. These initiators yield a fast, simple initiation of polymerization in the reactor as opposed to the slow stepwise initiations involving several polar complexes in equilibrium characteristic of the catalyst systems such as water or HCl initiators conventionally used in commercial cationic slurry polymerization of isobutylene copolymers. The initiator is a tertiary halide greater than $C_4$, wherein the initiator has the formula (A):

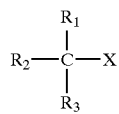

(A)

wherein X is a halogen; $R_1$ is selected from the group consisting of $C_1$ to $C_8$ alkyl, and $C_2$ to $C_8$ alkenyl; $R_3$ is selected from the group consisting of $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl, phenylalkyl, alkylphenyl, $C_3$ to $C_{10}$ cycloalkyl, and

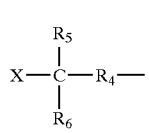

(B)

wherein X is a halogen; $R_5$ is selected from the group consisting of $C_1$ to $C_8$ alkyl, and $C_2$ to $C_8$ alkenyl; $R_6$ is selected from the group consisting of $C_1$ to $C_8$ alkyl, $C_2$ to $C_8$ alkenyl and phenylalkyl; and $R_4$ is selected from the group consisting of phenylene, biphenyl, α,ω-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position.

Substitution of the above structural formula radical (B) for $R_2$ in formula (A) results in the following formula (C):

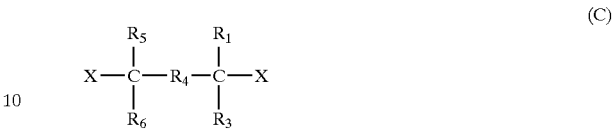

(C)

wherein X, $R_1$, $R_3$, R4, $R_5$ and $R_6$ are as defined above. The compounds represented by structural formula (C) contain two dissociable halides and may be considered as merely multiples of those compounds represented by structural formula (A).

Multifunctional initiators are employed where the production of branched copolymers is desired, while mono- and di-functional initiators are preferred for the production of substantially linear copolymers.

In one desirable embodiment of structure (A), the initiator is an oligomer of isobutylene as in structure (D):

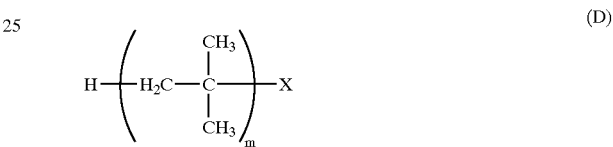

(D)

wherein X is a halogen, and the value of m is from 1 to 60, and mixtures thereof. In another embodiment, m is from 2 to 40. This structure is also described as a tertiary alkyl chloride-terminated polyisobutylene having a Mn up to 2500 in one embodiment, and up to 1200 in another embodiment.

Non-limiting examples of suitable initiators are cumyl esters of hydrocarbon acids, and alkyl cumyl ethers. Representative initiators, for example, comprise compounds such as 2-acetyl-2-phenylpropane, i.e., cumyl acetate; 2-methoxy-2-phenyl propane, i.e., cumylmethyl-ether; 1,4-di(2-methoxy-2-propyl)benzene, i.e., di(cumylmethyl ether); the cumyl halides, particularly the chlorides, i.e., 2-chloro-2-phenylpropane, i.e., cumyl chloride (1-chloro-1-methylethyl)benzene; 1,4-di(2-chloro-2-propyl)benzene, i.e., di(cumylchloride); 1,3,5-tri(2-chloro-2-propyl)benzene, i.e., tri(cumylchloride); the aliphatic halides, particularly the chlorides, i.e., 2-chloro-2,4,4-trimethylpentane (TMPCl), 2-bromo-2,4,4-trimethylpentane (TMPBr), 2,6-dichloro-2, 4,4,6-tetramethylheptane; cumyl and aliphatic hydroxyls such as 1,4-di((2-hydroxyl-2-propyl)-benzene), 2,6-dihydroxyl-2,4,4,6-tetramethyl-heptane, 1-chloroadamantane and 1-chlorobornane, 5-tert-butyl-1,3-di(1-chloro-1-methyl ethyl) benzene and similar compounds. Other suitable initiators may be found in U.S. Pat. No. 4,946,899, herein incorporated by reference for purposes of U.S. patent practice. These initiators are generally $C_5$ or greater tertiary or allylic alkyl or benzylic halides and may include polyfunctional initiators. Desirable examples of these initiators include: TMPCl, TMPBr, 2,6-dichloro-2,4, 4,6-tetramethylheptane, cumyl chloride as well as 'di-' and 'tri-' cumyl chloride or bromide. In another embodiment, the initiator is a tertiary alkyl chloride-terminated polyisobutylene with a Mn (number average molecular weight) up to 2500.

In one embodiment, the TMPCl is made by dissolving isobutylene dimer in methylchloride and then adding anhydrous HCl to form the alkyl chloride. Excess HCl is then purged by nitrogen and the resulting solution of TMPCl in methylchloride is used as the initiator stream in a continuous plant to make butyl polymers. In one embodiment of the commercial-type process, the TMPCl stream is mixed with a cold methylchloride (chloromethane) stream and an aluminum alkyl stream to form the catalyst system. This stream is then injected into the continuous flow stirred tank reactor ("CFSTR") used to produce butyl polymers under much more controllable and economic conditions than has previously been possible. In another embodiment, isobutylene dimers are reacted with HCl inline and then fed directly into the reactor.

Polymerization Reaction Conditions

The selected diluent or diluent mixture should provide a diluent medium having some degree of polarity in order for the polymerization to proceed at a reasonable rate. To fulfill this requirement, a mixture of nonpolar and polar diluents can be used. In the alternative, a mixture of, or a single polar diluent, is more desirable. Suitable nonpolar diluent components includes hydrocarbons and preferably aromatic or cyclic hydrocarbons or mixtures thereof. Such compounds include, for instance, methylcyclohexane, cyclohexane, toluene, carbon disulfide and others. Appropriate polar diluents include halogenated hydrocarbons, normal, branched chain or cyclic hydrocarbons. Specific compounds include the preferred liquid diluents such as ethyl chloride, methylene chloride (dichloromethane, $CH_2Cl_2$), methylchloride (chloromethane, $CH_3Cl$), $CO_2$, $CHCl_3$, $CCl_4$, n-butyl chloride, chlorobenzene, and other chlorinated hydrocarbons. Methylchloride is desirably used in an embodiment of the invention. To achieve suitable polarity and solubility, it has been found that if the diluent, or diluents, is mixed, the mixture is preferably at least 70% polar diluent, on a volume basis.

As is normally the case, product molecular weights are determined by reaction time, temperature, concentration, the nature of the reactants, and similar factors. Consequently, different reaction conditions will produce products of different molecular weights. Synthesis of the desired reaction product will be achieved, therefore, through monitoring the course of the reaction by the examination of samples taken periodically during the reaction, a technique widely employed in the art and shown in the examples or by sampling the effluent of a continuous reactor.

The reactors that may be utilized in the practice of the present invention include any conventional reactors and equivalents thereof capable of performing a continuous slurry process, such as disclosed in U.S. Pat. No. 5,417,930, herein incorporated by reference. The reactor pump impeller can be of the up-pumping variety or the down-pumping variety. The reactor will contain sufficient amounts of the catalyst system of the present invention effective to catalyze the polymerization of the monomer containing feed-stream such that a sufficient amount of polymer having desired characteristics is produced. The feed-stream in one embodiment contains a total monomer concentration greater than 30 wt % (based on the total weight of the monomers, diluent, and catalyst system), greater than 35 wt % in another embodiment. In yet another embodiment, the feed-stream will contain from 35 wt % to 50 wt % monomer concentration based on the total weight of monomer, diluent, and catalyst system.

The feed-stream is substantially free from silica cation producing species. By substantially free of silica cation producing species, it is meant that there is no more than 0.0005 wt % based on the total weight of the monomers of these silica species in the feed stream. Typical examples of silica cation producing species are halo-alkyl silica compounds having the formula $R_1R_2R_3SiX$ or $R_1R_2SiX_2$, etc., wherein "R" is an alkyl and "X" is a halogen. Finally, the feed stream should be free of aromatic-containing monomers such as para-alkylstyrene.

The reaction conditions will be such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, the monomer feed preferably should be substantially free of bases (such as caustic), sulfur-containing compounds (such as $H_2S$, COS, and organo-mercaptans, e.g., methyl mercaptan, ethyl mercaptan), N-containing compounds, oxygen containing bases such as alcohols and the like.

The polymerization reaction temperature is conveniently selected based on the target polymer molecular weight and the monomer to be polymerized as well as standard process variable and economic considerations, e.g., rate, temperature control, etc. The temperature for the polymerization is between –10° C. and the freezing point of the polymerization system in one embodiment, and from –25° C. to –120° C. in another embodiment. In yet another embodiment, the polymerization temperature is from –40° C. to –100° C., and from –70° C. to –100° C. in yet another embodiment. In yet another desirable embodiment, the temperature range is from –80° C. to –100° C. The temperature is chosen such that the desired polymer molecular weight is achieved. The reaction pressure will be from 200 kPa to 1600 kPa in one embodiment, from 300 kPa to 1200 kPa in another embodiment, and from 400 kPa to 1000 kPa in yet another embodiment.

The catalyst (Lewis Acid) to monomer ratio utilized will be those conventional in this art for carbocationic polymerization processes. In one embodiment of the invention, the catalyst to monomer mole ratios will be from 0.10 to 20, and in the range of 0.5 to 10 in another embodiment. In yet another desirable embodiment, the ratio of Lewis Acid to initiator is from 0.75 to 2.5, or from 1.25 to 1.5 in yet another desirable embodiment. The overall concentration of the initiator is from 50 to 300 ppm within the reactor in one embodiment, and from 100 to 250 ppm in another embodiment. The concentration of the initiator in the catalyst feed stream is from 500 to 3000 ppm in one embodiment, and from 1000 to 2500 in another embodiment. Another way to describe the amount of initiator in the reactor is by its amount relative to the polymer. In one embodiment, there is from 0.25 to 5.0 moles polymer/mole initiator, and from 0.5 to 3.0 mole polymer/mole initiator in another embodiment.

The reacted monomers within the reactor form a slurry. The term "slurry" refers to reacted monomers that have polymerized to a stage that they have precipitated from the diluent. The slurry "concentration" is the weight percent of these reacted monomers—the weight percent of the reacted monomers by total weight of the slurry, diluent, unreacted monomers, and catalyst system. In one embodiment, the concentration of the slurry is equal to or greater than 10 wt %. In another embodiment, the slurry is present in the reactor in a concentration equal to or greater than 25 wt %. In yet another embodiment, the slurry concentration in the reactor is less than or equal to 50 wt %. In yet another embodiment, the slurry is present in the reactor from 20 to 50 wt %. And in yet another embodiment, the slurry concentration is present in the reactor from 30 to 40 wt %.

The slurry is characterized by having a heat transfer coefficient ($h_{slurry}$) as defined above in equation (2). In one embodiment of the invention, the heat transfer coefficient of the slurry is from 200 to 500 Btu/hr•ft$^{2\circ}$ F. In another embodiment of the invention, the heat transfer coefficient of the slurry is from 300 to 450 Btu/hr•ft$^{2\circ}$ F.

The order of contacting the monomer feed-stream, catalyst, initiator, and diluent is not critical to this invention. In one embodiment, the initiator and Lewis Acid are pre-complexed by mixing together in cold methylchloride or other suitable cold polar diluent, immediately before injection into the continuous reactor through a catalyst nozzle in the standard way. Other methods may also be employed that will inject the initiator into the reactor. Desirably, the monomer is not contacted with the Lewis Acid and initiator at before entering the reactor. In yet another embodiment, Lewis Acid and the initiator are added to the reactor separately.

In another embodiment of the invention, the stabilizing initiator and Lewis Acid are allowed to precomplex by mixing together with varying contact times. Depending upon the catalyst efficiency desired, contact times may vary from 0.001 s, 0.002 s, 0.003 s, 0.004 s, 0.005 s, 0.006 s, 0.007 s, 0.008 s, 0.009 s, 0.010 s, 0.020 s, 0.030 s, 0.040 s, 0.050 s, 0.060 s, 0.070 s, 0.080 s, 0.090 s, 0.100 s, 0.200 s, 0.300 s, 0.400 s, 0.500 s, 0.600 s, 0.700 s, 0.800 s, 0.900 s, 1 s, 2 s, 3 s, 4 s, 5 s, 6 s, 7 s, 8 s, 9 s, to 10 s. Preferable ranges include 20 s or less, 30 s or less, 40 s or less, 50 s or less, 60 s or less, 70 s or less, 80 s or less, 90 s or less, 100 s or less, 110 s or less, and 120 s or less. Other preferable ranges include from 1 $\mu$s to 120 s, 100 $\mu$s to 60 s, 1 $\mu$s to 30 s, 0.45 s to 25 s, 0.01 s to 20 s, 0.05 s to 10 s, and 0.10 s to 5 s.

In another embodiment of the invention, the stabilizing initiator and Lewis Acid are precomplexed and injected into the reactor through a single reactor nozzle. In yet another embodiment of the invention, the stabilizing initiator and Lewis Acid, when fed into the reactor separately, are precomplexed in a mixing zone within the reactor. While not wishing to be bound to theory, it is believed that the Lewis Acid and the stabilizing initiator combine to yield a stable complex which is in equilibrium with a carbenium ion pair that directly forms a propagating polymer chain in the reactor. It has been discovered that shorter contact times have an unexpected beneficial effect on catalyst efficiency.

In a particularly preferred embodiment, TMPCl and EADC are combined at contact times in the ranges from 1 $\mu$s to 120 s, 100 $\mu$s to 60 s, 1 $\mu$s to 30 s, 0.45 s to 25 s, 0.01 s to 20 s, 0.05 s to 10 s, or 0.10 s to 5 s prior to combining with isobutylene as the isoolefin and isoprene as the conjugated diene comonomer.

In yet another particularly preferred embodiment, TMPCl and EASC are combined at contact times in the ranges from 1 $\mu$s to 120 s, 100 $\mu$s to 60 s, 1 $\mu$s to 30 s, 0.45 s to 25 s, 0.01 s to 20 s, 0.05 s to 10 s, or 0.10 s to 5 s prior to combining with isobutylene as the isoolefin and isoprene as the conjugated diene comonomer.

In one embodiment, the polymerization of isobutylene and isoprene to form butyl rubber comprises several steps. First, a reactor having a pump impeller capable of up-pumping or down-pumping is provided. The pump impeller is typically driven by an electric motor with a measurable amperage. The reactor typically is equipped with parallel vertical reaction tubes within a jacket containing liquid ethylene. The total internal volume, including the tubes, is greater than 30 to 50 liters, thus capable of large scale volume polymerization reactions. The reactor typically uses liquid ethylene to draw the heat of the polymerization reaction away from the forming slurry. The pump impeller keeps a constant flow of slurry, diluent, catalyst system and unreacted monomers through the reaction tubes. A feed-stream of the isoprene and isobutylene in a polar diluent is charged into the reactor, the feed-stream containing less than 0.0005 wt % of cation producing silica compounds, and typically free of aromatic monomers. The catalyst system is then charged into the feed-stream, the catalyst system having a Lewis acid and an initiator present in a molar ratio of from 0.50 to 10.0. Within the reactor, the feed-stream of monomers and catalyst system are allowed to contact one another, the reaction thus forming a slurry of butyl rubber, wherein the slurry has a concentration of from 25 wt % to 50 wt %. Finally, the thus formed butyl rubber is allowed to exit the reactor through an outlet or outflow line while simultaneously allowing the feed-stream charging to continue, thus constituting the continuous slurry polymerization. Advantageously, the present invention improves this process in a number of ways, ultimately reducing the amount of clogging that occurs in the exit port which is measured by pressure inconsistencies or "jumps".

The overall residence time in the reactor can vary, depending upon, e.g., catalyst activity and concentration, monomer concentration, feed injection rate, production rate, reaction temperature, and desired molecular weight, and generally will be between about one minute and five hours, and preferably between about 10 and 60 minutes. The principle variable controlling residence time is the monomer feed injection rate. The resultant polymer from one embodiment of the invention is a polyisobutylene/isoprene polymer (butyl rubber) that has a molecular weight distribution of from about 2 to 5, and an unsaturation of from 0.5 to 2.5 mole per 100 mole of monomer. This product may be subjected to subsequent halogenation to afford a halogenated butyl rubber.

The new catalyst system and process affords many unexpected advantages for commercial slurry polymerization of isoolefins and conjugated dienes. The improvements obtained with this new initiator are demonstrated in commercial plant scale tests. The following examples reflect embodiments of the invention and are by no means intended to be limiting of the scope of the invention.

EXAMPLES

Laboratory Experiments. The laboratory scale experiments highlight the unexpected nature of the invention exemplified in the plant scale experiments below. In these laboratory experiments, a feed blend of isobutylene (9.7 wt %) and isoprene (0.3 wt %) in methylchloride was chilled to −93° C. in a glass reactor contained in an inert atmosphere and polymerized in separate experiments by adding various amounts of Lewis acid and initiator as shown in Table 1. The initiator and Lewis acid concentrations present in each experiment are shown in the Table 1 as ppm. The Lewis acid and initiator was added to such a degree to the batch reactions as to achieve a 30 to 45% conversion of monomers as determined by the gravimetric yield. In all examples, the molecular weights (Mw) were determined by Gel Permeation Chromatography using a Waters Chromatograph operating at ambient temperature (30° C.). The HCl (Matheson) was used as a 260 ppm solution, and the tert-butylchloride (t-BuCl, Aldrich Chemical Company) was used as a 710 ppm solution. The TMPCl was made by ExxonMobil Chemical Company from isobutylene dimers and HCl by methods common in the art. The monomers are manufactured by ExxonMobil Chemical Company (Houston, Tex.).

The molecular weights in Table 1 are an average of three runs for each experiment.

TABLE 1

Laboratory Experiment Data

| Example | Initiator (ppm) | Lewis Acid (ppm) | % gravimetric yield | Mw |
|---|---|---|---|---|
| 1 | HCl (22) | EADC (230) | 47 | 242,000 |
| 2 | t-BuCl (55) | EADC (210) | 55 | 440,000 |
| 3 | TMPCl (70) | EADC (180) | 33 | 510,000 |
| 4 | TMPCl (130) | EADC (350) | 43 | 400,000 |
| 5 | TMPCl (105) | EASC (260) | 34 | 465,000 |

These data show that, while both tert-butylchloride and TMPCl increase the molecular weight of the resultant butyl polymer in a batch laboratory scale experiment, there was no significant difference between the two. Therefore, from the laboratory data one would expect that both TMPCl and tert-butylchloride would behave similarly in the continuous slurry plant reactors. Surprisingly, TMPCl initiated continuous slurry polymerization resulted in significant heat transfer and viscosity benefits, whereas tert-butylchloride initiated polymerization did not.

Plant Reactor Experiments. The examples are discussed below in relation to the figures in which the data is represented. Typical reaction conditions within the reactor are first outlined in Table 2, which are conditions for the continuous slurry reactor plant test examples with initiators of the invention and comparative examples using HCl and tert-butylchloride as initiators.

TABLE 2

Properties and Reaction Conditions in Plant Scale Tests

| Property/Ingredient | Amount/Value |
|---|---|
| Production Rate | 6000 lb/hr (2,727 kg/hr) |
| Feed Rate | 22,000 lb/hr (10,000 kg/hr) |
| Isobutylene (in feed-stream) | 30.7 wt % to 39 wt % |
| Isoprene | 2.65 wt % |
| TMPCl (20% solution) | 35 lb/hr (15.9 kg/hr) |
| EADC/TMPCl (mole/mole) | 1.5 to 1.25 |
| Slurry Concentration | 25 wt % to 32.5 wt % |
| Isobutylene Conversion | 85% to 88 wt % |
| Diluent | Methylchloride |
| Initial Reactor Temperature | −98.3° C. (−145° F.) |

The conditions in Table 2 correspond to TMPCl initiated reactions as well as the HCl and tert-butylchloride initiated reactions except for the following: in the case of the TMPCl initiated reaction, the feed blends were increased from 30.7 wt % to 39 wt %. In the comparative examples, the feed blend was constant at 30.7 wt %. The monomers are manufactured by ExxonMobil Chemical Company (Houston, Tex.). The methylchloride (Dow Chemical Company), EADC (Albemarle), and HCl (Matheson) were used as received, and the TMPCl was made by ExxonMobil Chemical Company by reacting isobutylene dimers and HCl from methods common in the art.

FIG. 1. FIG. 1 is a graphical representation of data showing butyl polymerization conditions in an embodiment of the invention, the data plotted as the reactor slurry side heat transfer coefficient as a function of reactor turnover. The slurry side heat transfer coefficient ($h_{slurry}$) is the heat transfer coefficient (h) of the slurry within the butyl reactor tubes, as opposed to the heat transfer resistance of the reactor tube walls and/or the heat transfer coefficient of the boiling ethylene used to remove heat from the reactor. The value of "h" (Btu/hr•ft$^2$•° F.) is a function of the viscosity of the slurry ($\mu_b$), and is related as such by the well known Sieder-Tate equation (2) discussed above.

In these examples, the reactor was operated with a frozen methylchloride (the diluent) film coating the tubes. The difference between the bulk slurry temperature and the frozen ice film was then measured. The temperature of the frozen ice film can be calculated from the monomer concentration in the reactor and the correlation with its freezing point. Using the equation (3) below, the value for the slurry side heat transfer coefficient $h_{slurry}$ was obtained:

$$h_{slurry} = \frac{Q}{A(T_{slurry} - T_{MeClice})} \quad (3)$$

where Q is the heat removed from the reactor during polymerization, A is the heat transfer area of the reactor, $T_{slurry}$ is the average bulk temperature of the reactor slurry, and $T_{MeClice}$ (MeCl is methylchloride) is the average temperature of the frozen ice film, as defined in equation (4) below:

$$T_{MeClice} = -143.8 - 0.75(M) \quad (4)$$

where −143.8 is the freezing point temperature (in ° F.) of pure methylchloride and M is the wt % concentration of isobutylene in the slurry.

The data in FIG. 1 shows comparative data between HCl initiated butyl polymerization and TMPCl initiated butyl polymerization at various slurry concentrations. A best fit line (linear regression) is drawn through the linear portion of the data, which takes into account the time for the slurry concentration in the reactor to build up to its steady state value of three turnovers, and hence the initially large $h_{slurry}$ values. In the comparative HCl initiated reaction, the slurry concentration is 25.3 wt % by total weight of slurry, diluent, monomers, and other reactor components. At the same slurry concentration, the TMPCl initiated reaction has a higher $h_{slurry}$ value, thus translating by equation (1) to a lower viscosity. When the slurry concentration for the TMPCl initiated reaction is increased to 29 wt %, the $h_{slurry}$ value, and hence the viscosity, does not change appreciably. When the slurry concentration is increased to 32.5 wt % for the TMPCl initiated reaction, the value of $h_{slurry}$ is above that of the HCl initiated reaction.

These data show that the heat transfer coefficient of the slurry is from 375 to 450 Btu/hr•ft$^2$•° F. when the slurry concentration is from 25 to 30 wt %; and the heat transfer coefficient of the slurry is from 200 to 350 Btu/hr•ft$^2$•° F. when the slurry concentration is from 30 to 35 wt %. These data indicate that the TMPCl initiator raises the heat transfer coefficient and thus allowing a higher slurry concentration to be run in the butyl reactor and/or longer reactor run lengths.

Figure 2:
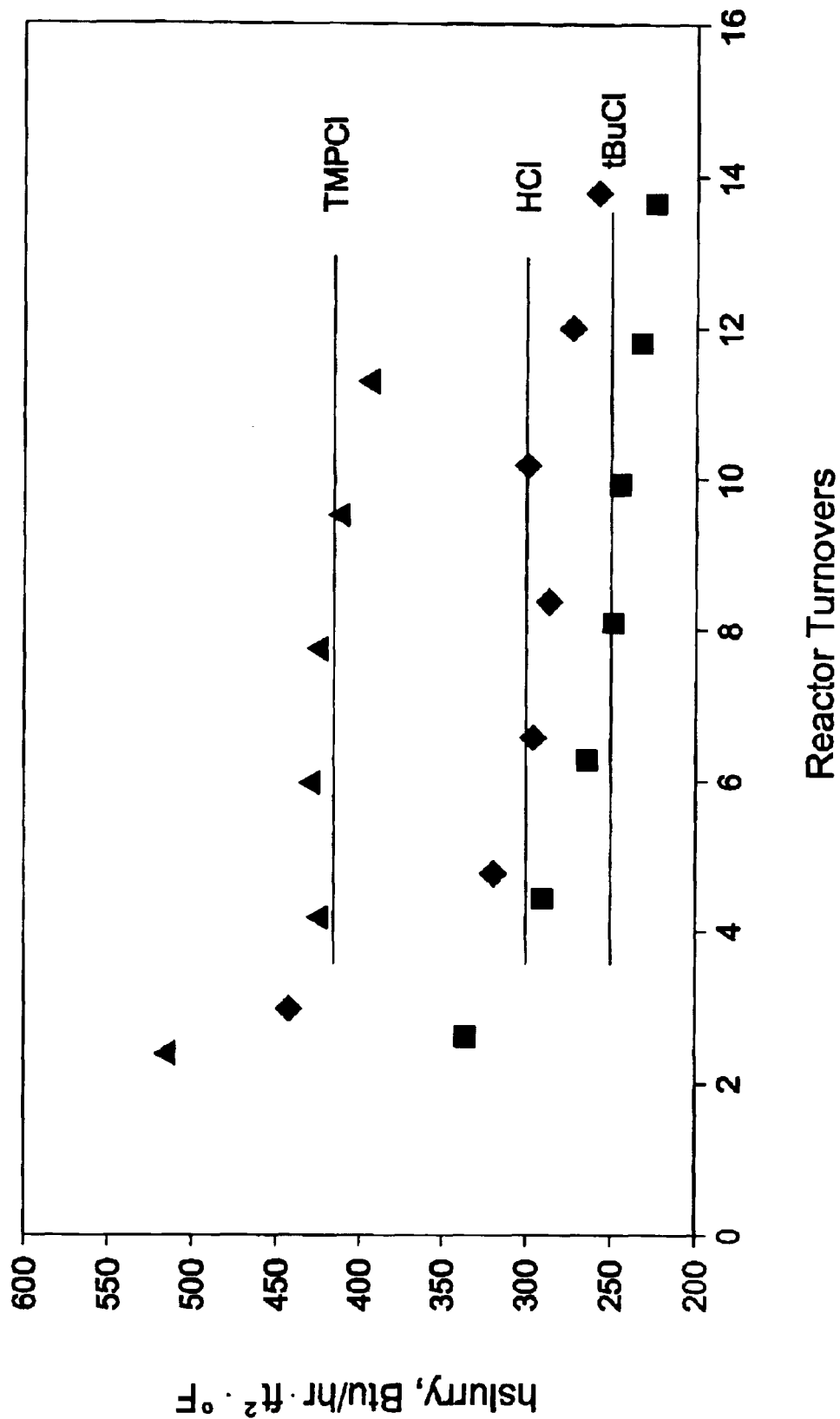
FIG. 2 is a graphical representation of data showing butyl polymerization conditions in an embodiment of the invention, the data plotted as the reactor slurry side heat transfer coefficient as a function of reactor turnover.

FIG. 2. FIG. 2 is a graphical representation of data showing butyl polymerization conditions in an embodiment of the invention, the data plotted as the reactor slurry side heat transfer coefficient as a function of reactor turnover. A best fit line (linear regression) is drawn through the linear portion of the data, which takes into account the time for the slurry concentration in the reactor to build up to its steady state value of three turnovers, and hence the initially large $h_{slurry}$ values. In this Example, HCl, tert-butylchloride (Aldrich Chemical Company), and TMPCl are used as initiators in separate butyl reactions and compared.

The values for $h_{slurry}$ for the HCl initiated reaction are around 300 Btu/hr•ft$^2$•° F. (1.7 kW/m$^2$K) after about 4 to 6 reaction turnovers at a slurry level of 25.6 wt % and production rate of 6.0 Klb/hr (2.72 T/hr). When tert-butylchloride is the initiator at a slurry level of 25.4 wt % and production rate of 6.3 Klb/hr (2.86 T/hr), the $h_{slurry}$ values decrease, thus indicated that the slurry viscosity increases slightly. When TMPCl is the initiator at a slurry level of 26.1 wt % and production rate of 6.3 Klb/hr (2.86 T/hr), the $h_{slurry}$ values increase to above 400 Btu/hr•ft$^2$•° F. (2.27 kW/m$^2$K). Thus, when compared to tert-butylchloride and HCl, the TMPCl initiated polymerization efficiency is improved.

Figure 3:
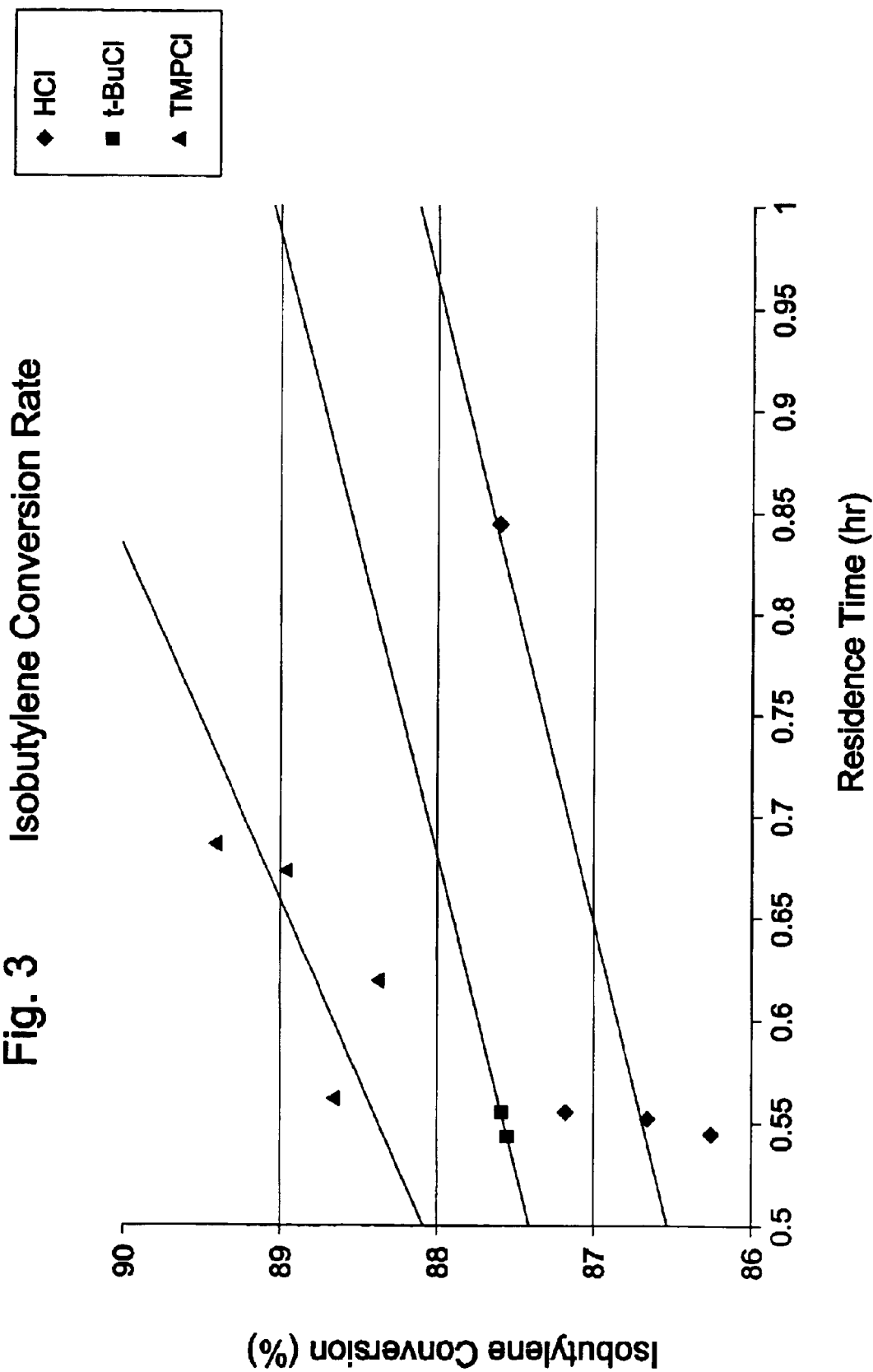
FIG. 3 is a graphical representation of data showing butyl polymerization conditions in an embodiment of the invention, the data plotted as the percentage isobutylene conversion within the reactor as a function of the reactor residence time.

FIG. 3. The present example shows how the conversion of monomers within the reactor increases when an embodiment of the invention is used. Specifically, FIG. 3 is a graphical representation of data showing butyl polymerization conditions in an embodiment of the invention, the data plotted as the percentage isobutylene conversion within the reactor as a function of the reactor residence time.

In the HCl initiated butyl polymerization reaction, the isobutylene conversion increases from about 86.5 to about 87.5% over a residence time of 0.85 hours. The conversion for tert-butylchloride initiated polymerization is about 87.5%. For the TMPCl initiated reaction, the conversion is from about 88.5% to about 89.5% isobutylene over a time period of from 0.55 hours to about 0.7 hours. This embodiment of the invention shows a 15% decrease of the amount of unreacted monomer remaining, i.e., a significant improvement in monomer conversion. These data show that the TMPCl initiated reaction improves the conversion of monomer, thus improving the overall butyl polymerization process and allowing a higher slurry concentration to be run and/or longer run lengths.

Figure 4B:
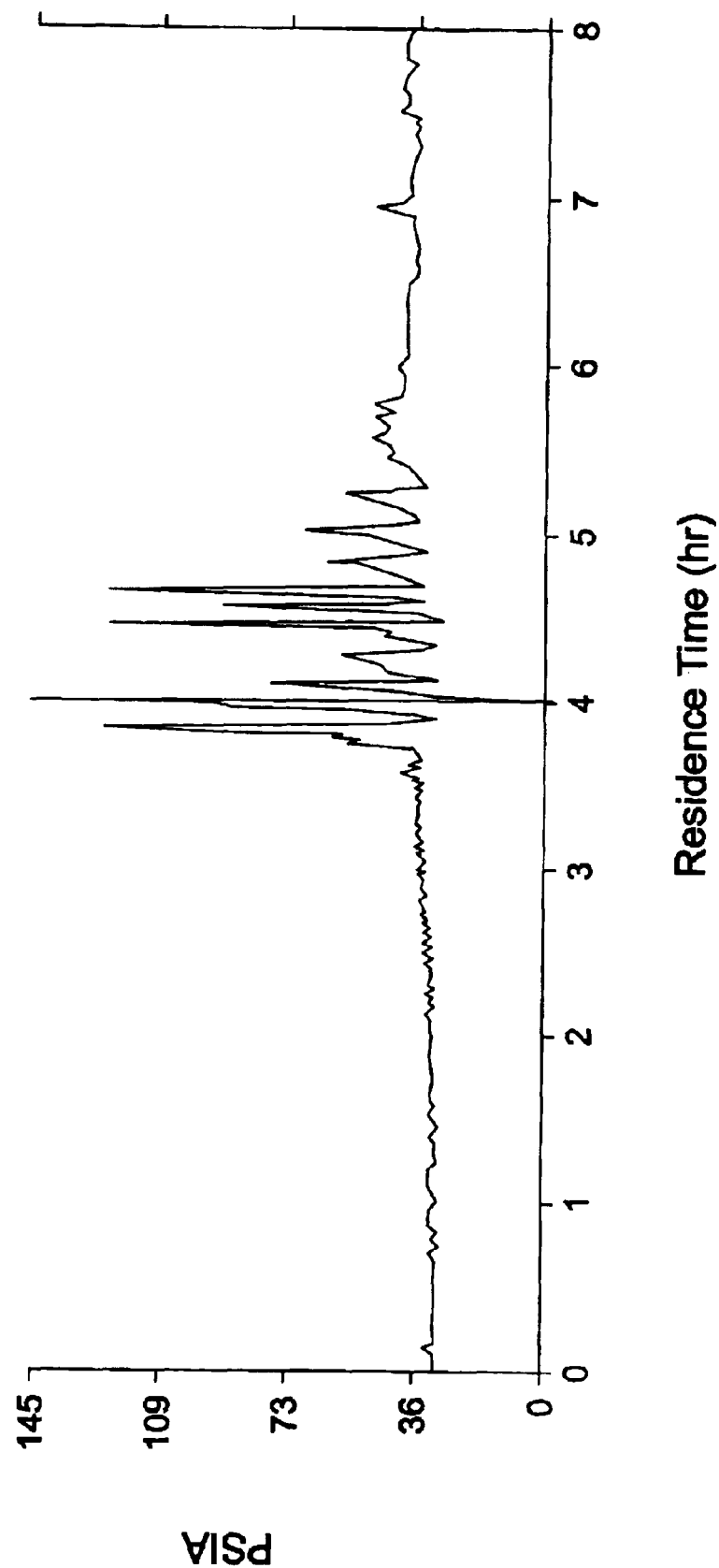
FIG. 4B is a graphical representation of data showing butyl polymerization conditions in an embodiment of the invention, the data plotted as reactor pressure as a function of reactor residence time with HCl as the initiator.

FIG. 4. The present example in FIG. 4 highlights the lowered agglomeration tendency due to the lowered viscosity of the butyl slurry when using embodiments of the invention. Specifically, FIG. 4A is a graphical representation of data showing butyl polymerization conditions in an embodiment of the invention, the data plotted as the reactor pressure as a function of reactor residence time with TMPCl initiator present. FIG. 4B is a graphical representation of data showing butyl polymerization conditions in an embodiment of the invention, the data plotted as reactor pressure as a function of reactor residence time with HCl as the initiator. The pressure is measured at the feed inlet to the reactor, and is representative of the internal pressure within the reactor itself. When the internal reactor pressure rises, this is indicative of agglomeration of the slurry in the outlet or overflow line, and is detected as a clogging and, hence, pressure increase, at that point in the reactor.

The data in FIG. 4A is with a slurry concentration of 32.5 wt %, while the slurry concentration for the HCl initiated reaction in FIG. 4B is 30 wt %. Note the differences in the y-axis scale between the two graphs. The data show that the baseline pressure level at about 41 psia is relatively constant until the reactor is turned off after about a 20 hour run. However, when HCl is used as the initiator, even at the lower slurry level, there are significant pressure buildups after 8 hours of reaction time, the pressure buildups or "kickings" are indications of agglomeration and clogging of the butyl reactor.

Figure 5:
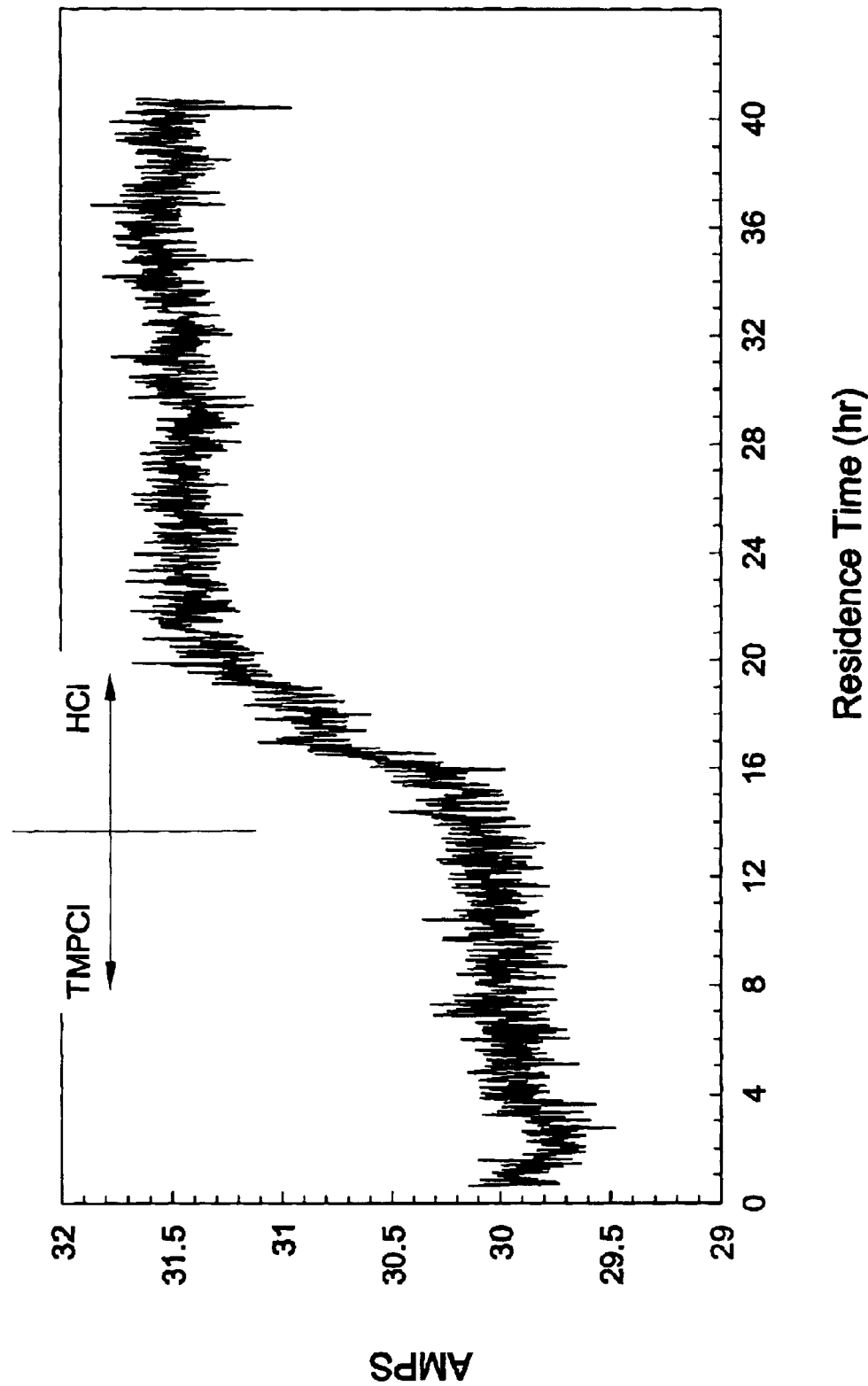
FIG. 5 is a graphical representation of data showing butyl polymerization conditions in an embodiment of the invention, the data plotted as the amperage drawn to power the reactor pump impeller as a function of reactor residence time, wherein TMPCl is present during the first part of the reaction, and HCl is present in the second part of the reaction.

FIG. 5. The data in this example are consistent with a lowering of the viscosity of the butyl slurry when embodiments of the invention are used. Specifically, FIG. 5 is a graphical representation of data showing butyl polymerization conditions in an embodiment of the invention, the data plotted as the amperage drawn to power the reactor pump impeller as a function of reactor residence time, wherein TMPCl is present during the first part of the reaction, and HCl is present in the second part of the reaction.

In this example, the butyl polymerization reaction is run for about 22 hours at a slurry concentration of 25 wt % using TMPCl as the initiator in a concentration of 2000 ppm in the catalyst stream entering the reactor, and 200 ppm in the reactor. Then, HCl is added to the reactor, while the TMPCl-laden slurry is allowed to exit the reactor. Specifically, the concentration of HCl in the catalyst stream entering the reactor is normally in the range of from 100 to 200 ppm, and the concentration in the reactor is between from 10 to 20 ppm. The transition period from HCl to TMPCl initiator is about 2 hours. As HCl replaces the TMPCl as the initiator, the motor that drives the reactor pump impeller must work harder to stir the slurry, as indicated by the increased power draw. This is consistent with the lower viscosity with TMPCl as the initiator. While not wishing to be bound by an equation, the results in FIG. 5 are consistent with what equation (2) would predict. Specifically, the $h_{slurry}$ values when HCl is the initiator range from about 411 to 592 Btu/hr•ft$^2$•° F. (2.33 to 3.36 kW/m$^2$K), while that of the TMPCl initiated reaction varies from 241 to 261 Btu/hr•ft$^2$•° F. (1.37 to 1.48 kW/m$^2$K).

Figure 6:
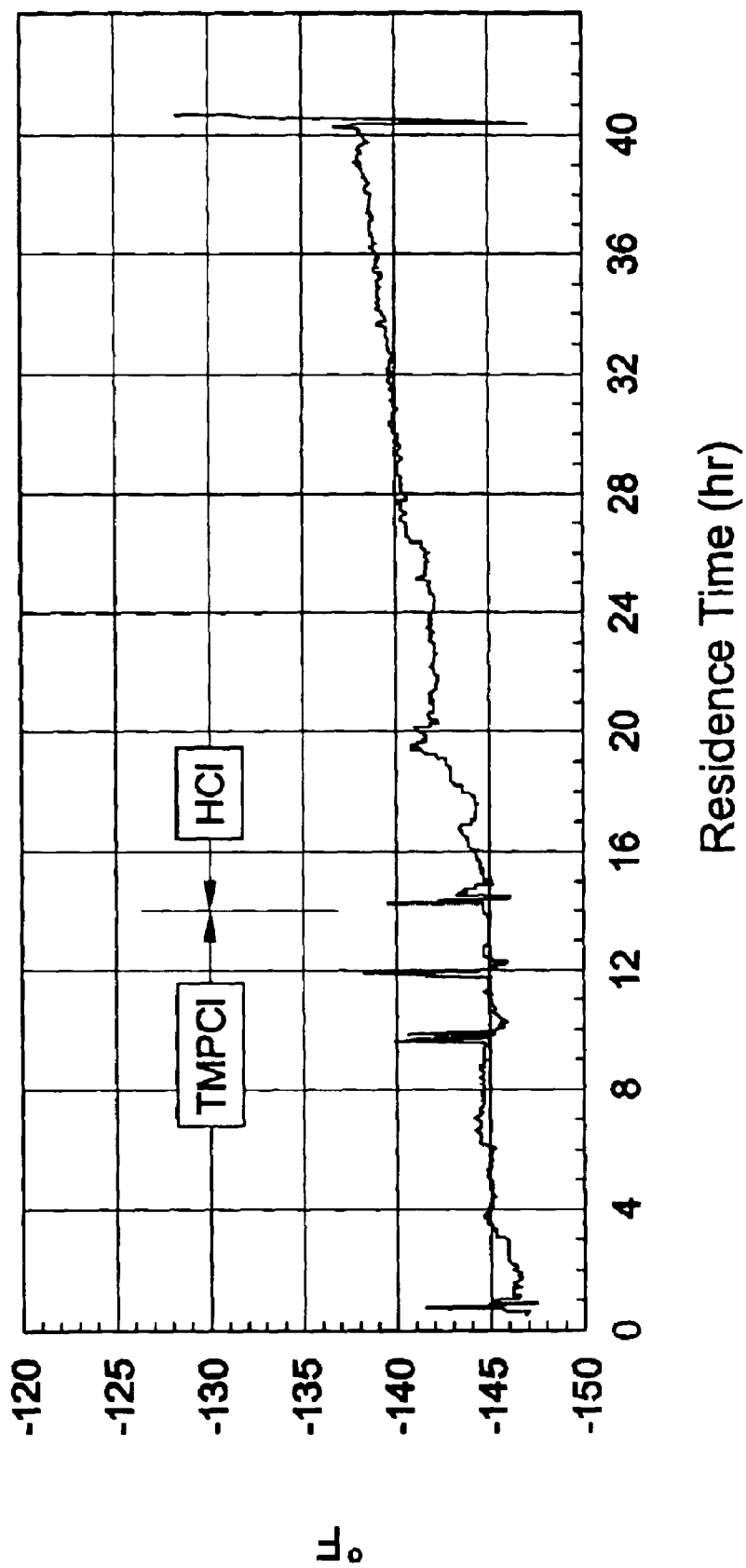
FIG. 6 is a graphical representation of data showing butyl polymerization conditions in an embodiment of the invention, the data plotted as the slurry temperature as a function of reactor residence time, wherein TMPCl is present during the first part of the reaction, and HCl is present in the second part of the reaction.

FIG. 6. In this example, the temperature of the slurry in the example of FIG. 5 was measured directly, beginning with the TMPCl initiated reaction, and followed by injection of HCl as the initiator. As seen in the graph, the temperature is steady at −98.3° C. (−145° F.), but steadily rises as HCl is added as the initiator. These data show how the embodiment of the invention improves heat transfer in the butyl reactor, thus improving the polymerization efficiency.

Figure 7:
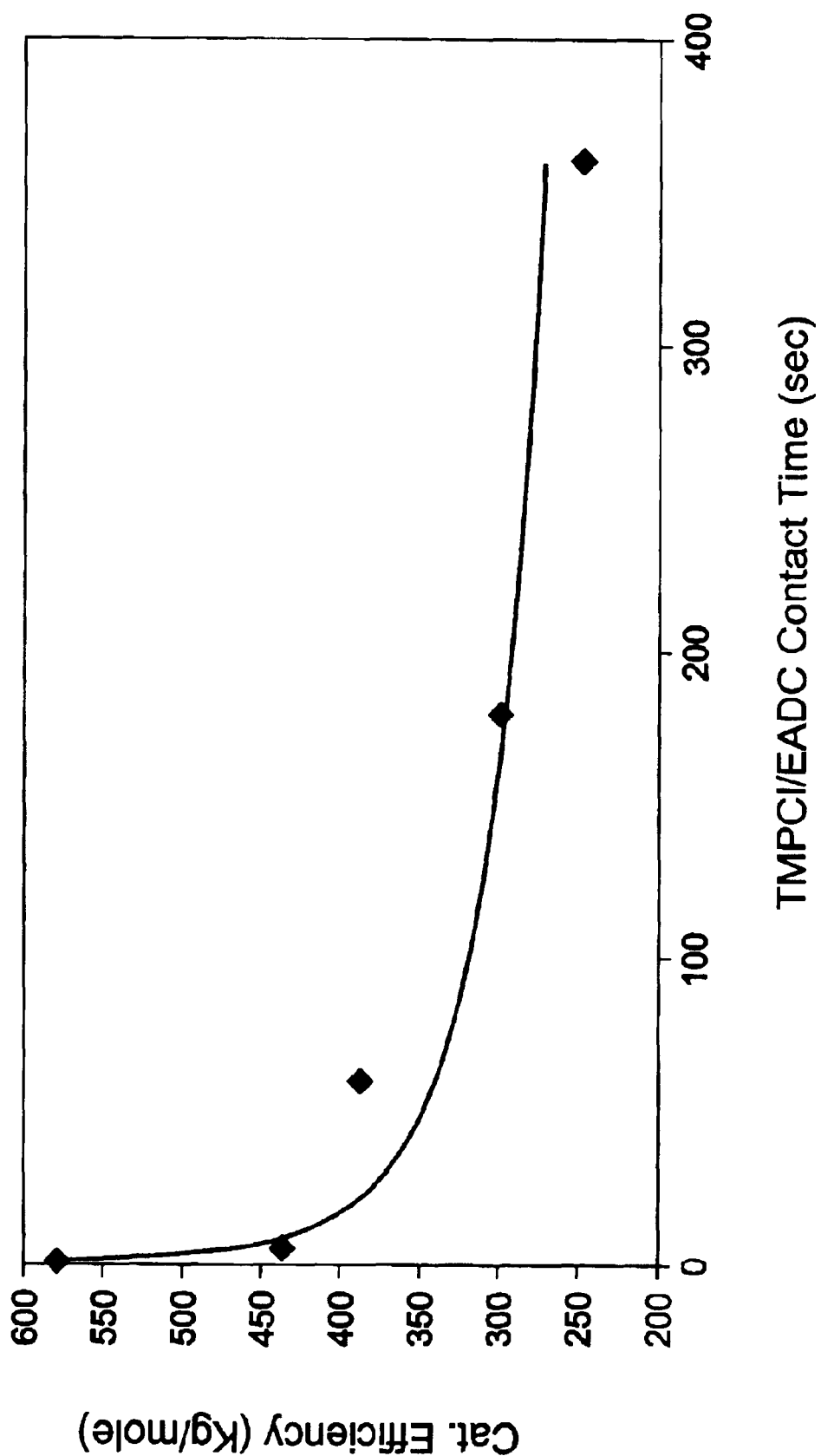
FIG. 7 is a graphical representation of data showing catalyst efficiency plotted as a function of TMPCl/EADC contact times.

FIG. 7. In these examples, the polymerization reactions were carried out in the cold bath of a dry box using 3-neck round bottom flask reactors with mechanical stirring at ∼−95° C. The initiator (2-chloro-2,4,4-trimethyl pentane (TMPCl)) for the polymerization was vacuum distilled at room temperature to remove excess HCl gas. The co-initiator for the polymerization (25.3 wt % ethyl aluminum dichloride in Heptane (EADC)) was purchased from AKZO NOBEL and used directly. The monomer (Isobutylene) and the comonomer (Isoprene) for the polymerization were passed through a drying column or vacuum distilled before use. The diluent, methyl chloride, was passed through a drying column before reaction. The feed blend (10 wt % of monomer solution) was prepared from the mixture of monomer(s) and diluent before reaction and stored at ∼−95° C. in the cold bath. The initiator and coinitiator stock solutions were prepared by mixing methyl chloride with distilled TMPCl and methyl chloride with 25 wt % EADC. The glassware used for the polymerizations was cleaned with 150 ml methyl chloride and 15 µl of 25.3 wt % EADC and prechilled to ∼−95° C. in the cold bath right before reaction. 300 ml of feed blend was transferred into the clean glass reactor and chilled to ∼−95° C. in cold bath before reaction. For shorter contact times, i.e., (0 to 1 sec) experiments the initiator was mixed with the feed blend at ∼−95° C. in cold bath and then the coinitiator was added. For other contact times, the initiator and coinitiator were mixed in a glass vial with different contact times (2 sec, 5 sec, 60 sec, 180 sec, and 360 sec) before being added to the reactor. When the reactor temperature had stopped rising, 25 ml Isopropanol with BHT as a stabilizer was added to quench the reaction. After the solvent had boiled off, the polymer was dried in a vacuum oven at 45° C. overnight. The polymer was then removed and weighed to calculate the catalyst efficiency.

TABLE 3

TMPCl/EADC Contact Times and Catalyst Efficiency

|  | RXN1 | RXN2 | RXN3 | RXN4 | RXN5 |
|---|---|---|---|---|---|
| Catalyst Efficient (Kg/mole) | 579 | 437 | 388 | 300 | 248 |
| TMPCl/EADC Contact Time (sec) | 0 to 1 | 5 | 60 | 180 | 360 |

As can be see, shorter contact times of TMPCl and EADC unexpectedly resulted in improved catalyst efficiency. The results are also graphically depicted in FIG. 7.

Discussion

The present invention has several advantages. Because of the rapid reactor mass fouling rate that typically occurs, reactors had to be operated at very low slurry concentrations and heat loads to achieve the run lengths required to allow washing and turnaround to be accomplished in the time available before the fouled reactor had to be put back into production to replace another fouled reactor. The present invention, as shown in the examples, will allow the butyl reactors to be run at higher slurry concentrations and/or run at a lower concentration for a longer period of time before fouling. In one embodiment of the invention, the run length is increased from 30% to 200% relative to the run length when HCl or $C_4$ or smaller initiators are used in the catalyst system.

Embodiments of the invention improve the heat transfer within the reactor. The improved heat transfer can allow either higher slurry concentrations, or longer run length. The heat transfer coefficient is thus higher due to the lower viscosity of the slurry as would be predicted using the Sieder-Tate equation for turbulent flow. Not only are higher slurry concentrations possible due to the improved heat transfer, but a higher monomer conversion rate is also achieved. Further, there is a lower overflow line plugging rate with embodiments of the present invention and steadier reactor operation due to the lower pump power consumption. Also, since heat transfer is improved, longer run lengths at relatively low slurry concentrations (below 25 wt %) are possible since it is known that the reactor will stay cold (liquid ethylene temperatures) for longer when the heat transfer coefficient of the slurry is low. The cooler temperatures lower the fouling rate of the heat transfer surfaces, thus allowing the reactor to stay on line without stoppage for cleaning for a longer period of time that was previously possible.

All patents, applications and publications cited herein, including those relied upon for priority, are herein incorporated by reference for purposes of U.S. patent practice.

What is claimed is:

1. A polymerization method for use in a continuous slurry polymerization reactor in preparing random copolymers of one or more isoolefin monomers and one or more conjugated diene monomers, the reacted monomers forming the slurry within the reactor, the method comprising reacting in a polar diluent the isoolefin and diene monomers, a Lewis acid, and an initiator, wherein the initiator has the formula:

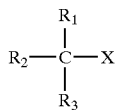

wherein X is a halogen; $R_1$ is selected from the group consisting of, $C_1$ to $C_8$ alkyl, and $C_2$ to $C_8$ alkenyl; $R_3$ is selected from the group consisting of, $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl phenylalkyl, alkylphenyl, $C_3$ to $C_{10}$ cycloalkyl, and

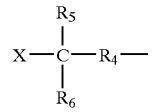

wherein X is a halogen; $R_5$ is selected from the group consisting of, $C_1$ to $C_8$ alkyl, and $C_2$ to $C_8$ alkenyl; $R_6$ is selected from the group consisting of, $C_1$ to $C_8$ alkyl, $C_2$ to $C_8$ alkenyl and phenylalkyl; and $R_4$ is selected from the group consisting of phenylene, biphenyl, α,ω-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position; and wherein the Lewis acid and the initiator are contacted with a contact time of from less than 60 s prior to contacting with the isoolefin and the diene monomers.

2. The polymerization method of claim 1, wherein the contact time is from less than 30 s.

3. The polymerization method of claim 1, wherein the contact time is from less than 25 s.

4. The polymerization method of claim 1, wherein the contact time is from less than 20 s.

5. The polymerization method of claim 1, wherein the contact time is from less than 15 s.

6. The polymerization method of claim 1, wherein the contact time is from less than 10 s.

7. The polymerization method of claim 1, wherein the contact time is from less than 5 s.

8. A continuous slurry polymerization process for preparing random copolymers of one or more isoolefin monomers and one or more para-alkylstyrene monomers comprising reacting in an anhydrous polymerization system of said monomers, a polar solvent, a Lewis acid, and an initiator, said polymerization system being capable of forming an in-situ electron pair donor initiator having the formula:

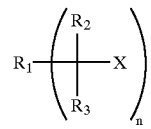

wherein:

$R_1$ is an alkyl, alkenyl, aryl, aralkyl, or aralkenyl group containing up to 30 carbon atoms but not less t learnt one olefinic unsaturation, $R_2$ and $R_3$ are alkyl, aryl, or aralkyl groups containing up to 30 carbon atoms and can be the same or different, x is a halogen or a carboxy, hydroxyl, or alkoxyl group, and n is a positive whole number; and wherein the Lewis acid and the initiator are contacted with a contact time of from less than 60 s prior to contacting with the isoolefin and the para-alkylstyrene monomers.

9. The continuous slurry polymerization process of claim 8, wherein the contact time is from less than 30 s.

10. The continuous slurry polymerization process of claim 8, wherein the contact time is from less than 25 s.

11. The continuous slurry polymerization process of claim 8, wherein the contact time is from less than 20 s.

12. The continuous slurry polymerization process of claim 8, wherein the contact time is from less than 15 s.

13. The continuous slurry polymerization process of claim 8, wherein the contact time is from less than 10 s.

14. The continuous slurry polymerization process of claim 8, wherein the contact time is from less than 5 s.

15. A polymerization method for use in a continuous slurry polymerization reactor in preparing a homopolymer of an isoolefin, the polymerization method comprising contacting isoolefin monomers, a Lewis acid, and an initiator, wherein the initiator has the formula:

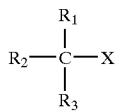

wherein X is a halogen; $R_1$ is selected from the group consisting of $C_1$ to $C_8$ alkyl, and $C_2$ to $C_8$ alkenyl; $R_3$ is selected from the group consisting of, $C_1$ to $C_8$ alkyl, $C_2$ to $C_8$ alkenyl and phenylalkyl; and $R_2$ is selected from the group consisting of $C_4$ to $C_{200}$ alkyl, $C_2$ to $C_8$ alkenyl, phenyl, phenylalkyl. alkylphenyl, $C_3$ to $C_{10}$ cycloalkyl, and

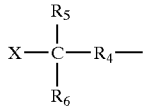

wherein X is a halogen; $R_5$ is selected from the group consisting of, $C_1$ to $C_8$ alkyl, and $C_2$ to $C_8$ alkenyl; $R_6$ is selected from the group consisting of, $C_1$ to $C_8$ alkyl, $C_2$ to $C_8$ alkenyl and phenylalkyl; and $R_4$ is selected from the group consisting of phenylene, biphenyl, α,ω-diphenylalkane and $-(CH_2)_n-$, wherein n is an integer from 1 to 10; and wherein $R_1$, $R_2$, and $R_3$ can also form adamantyl or bornyl ring systems, the X group being in a tertiary carbon position; and wherein the Lewis acid and the initiator are contacted with a contact time of from less than 60 s prior to contacting with the isoolefin monomers.

16. The polymerization method of claim 15, wherein the contact time is from less than 30 s.

17. The polymerization method of claim 15, wherein the contact time is from less than 25 s.

18. The polymerization method of claim 15, wherein the contact time is from less than 20 s.

19. The polymerization method of claim 15, wherein the contact time is from less than 15 s.

20. The polymerization method of claim 15, wherein the contact time is from less than 10 s.

21. The polymerization method of claim 15, wherein the contact time is from less than 5 s.

* * * * *